WITNESSES:
E. A. McCloskey
[signature]

INVENTOR
Owen L. Taylor.
BY Arthur T. Stratton
ATTORNEY

April 7, 1959 — O. L. TAYLOR — 2,881,279

WIRING DEVICE

Filed April 12, 1954 — 4 Sheets-Sheet 2

April 7, 1959 O. L. TAYLOR 2,881,279

WIRING DEVICE

Filed April 12, 1954 4 Sheets-Sheet 3

April 7, 1959 O. L. TAYLOR 2,881,279

WIRING DEVICE

Filed April 12, 1954

4 Sheets-Sheet 4

2,881,279

WIRING DEVICE

Owen L. Taylor, Bridgeport, Conn., assignor to The Bryant Electric Company, Bridgeport, Conn., a corporation of Connecticut Application April 12, 1954, Serial No. 422,404
12 Claims. (Cl. 200—67)

My invention relates generally to electric wiring devices, and more particularly to new and improved terminals for use in such devices.

Although in principle my invention is applicable to a wide variety of wiring devices it is more particularly suited for the smaller low voltage devices where the terminal cost is a substantial percentage of the cost of the complete wiring device. Heretofore, such low voltage devices have utilized terminals which have been permanently secured to the base or housing of the wiring device in some manner, such as by riveting or by using spun bushings. In many cases such wiring devices have required insulating spacers and/or separate internal conductors. Such fabrication processes and the additional material used involve considerable expense to such a degree that in some instances the cost of assembly may exceed the value of the components of the device. As can also be appreciated, such fabrication processes require machinery and dies whereby the processes can be performed on a production basis, which is an additional expense which must be reflected in the selling price of the wiring device.

Accordingly, one object of my invention is to provide a wiring device having a new and improved terminal of simplified construction.

Another object of my invention is to provide a wiring device having a new and improved terminal which is stressed into position within the device.

Another object of my invention is to provide a new and improved wiring device having a terminal with integral securing means.

Another object of my invention is to provide a new and improved wiring device having a terminal which may be assembled therein without the use of jigs and fixtures or other special tools.

Still another object of my invention is to provide a new and improved wiring device having a terminal which may be secured therein by an integral portion of the terminal.

Still another object of my invention is to provide a new and improved wiring device having a terminal which may be secured thereto by an integral portion of the terminal which is engageable with the housing of the wiring device.

A more specific object of my invention is to provide a new and improved wiring device having a terminal secured to the wiring device by an integral portion of the terminal which is bent to engage a tapered portion of the housing of the wiring device so as to stress the terminal in place.

Another specific object of my invention is to provide a new and improved wiring device having a terminal secured to the wiring device by compressing integral portions of the terminal between portions of the device housing.

These and other objects of my invention will become more apparent upon consideration of the following detailed description of wiring devices incorporating terminals constructed in accordance with the principles of my invention, when taken in connection with the attached drawings. It should be noted however that my invention is suitable for various types of wiring devices and for the purpose only of better understanding my invention, the following description and drawings are specifically related to electric switches which incorporate terminals constructed in accordance with the principles of my invention. It is to be realized, however, that such terminals could with equal ease be shown and used with other types of wiring devices.

Accordingly, Figure 1 is a longitudinal sectional view of a switch having located therein one type of terminal constructed in accordance with the principles of my invention;

Figure 1:
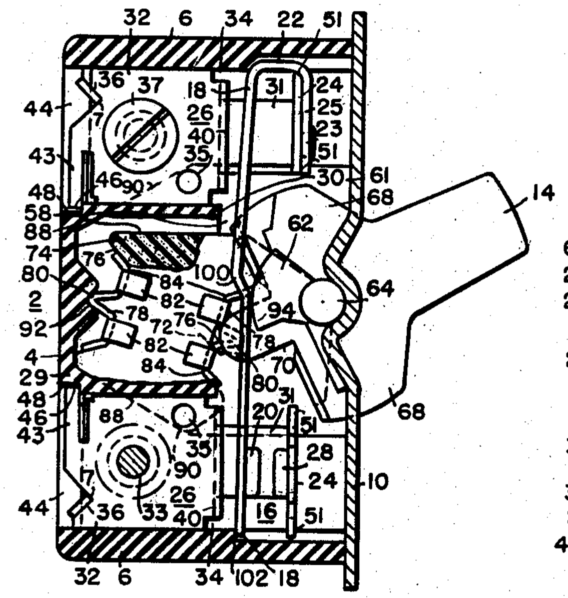

Broadly speaking, my invention comprises a wiring device having a formed housing in which is located a formed terminal having at least one member which is stressed by engagement with the housing, whereby the terminal cannot be freely removed from the housing. Figs. 1 to 6 illustrate this invention incorporated in a switch similar to that disclosed and claimed in my co-pending application, Serial No. 339,293, filed February 27, 1953 entitled "Switch Construction" and which has been assigned to the same assignee as this invention, and with which it has certain novel features of cooperation. For a detailed description of this type of switch and particularly its operating mechanism, reference is hereby made to the aforesaid co-pending application.

Such a switch, generally speaking comprises a rectangular housing 2 having a base 4 and upwardly extending ends and side walls 6 and 8, respectively. Housing 2 is formed from any suitable insulating material, such as a molded phenolic material, the front of which is adapted to be closed by a cover 10 which may be of any suitable material, such as sheet metal, and which may be secured in place to housing 2 in any suitable manner, such as by screws (not shown). An operating handle 14 of insulating material, such as a molded insulating material, is adapted to be centrally located in the housing 2 and it projects through an opening (not shown) in the cover 10. A switch is located in the housing 2 at each side of the operating handle 14 with each switch including a contact carrying arm 18 of a resilient conducting material, such as a copper alloy, having a contact 20 located adjacent the outer end of the arm 18. The restrained end of each arm 18 is bent at 22 to form an upwardly spaced inwardly projecting portion 23 which is secured to the upper leg 24 of the U-shaped upper end of a terminal 26 in any desired manner such, for example, as by an integral rivet portion 25 on upper leg 24, or the like.

There is a similar terminal 26 for each switch at the other end of casing 2 having a stationary contact 28 similar to the contact 20 mounted on the downwardly facing side of the upper leg 24 of the U-shaped upper portion of terminal 26, which cooperates with the contact 20 mounted on the arm 18 to establish and break the electrical contact between the terminals 26 of each switch. Contacts 20 and 28 may be secured to the arm 18 and the upper leg 24 of terminals 26, respectively, by any suitable means such as by upsetting a portion 5 of contacts 20 and 28 which extends through the arm 18 and the upper leg 24, respectively.

Figure 3:
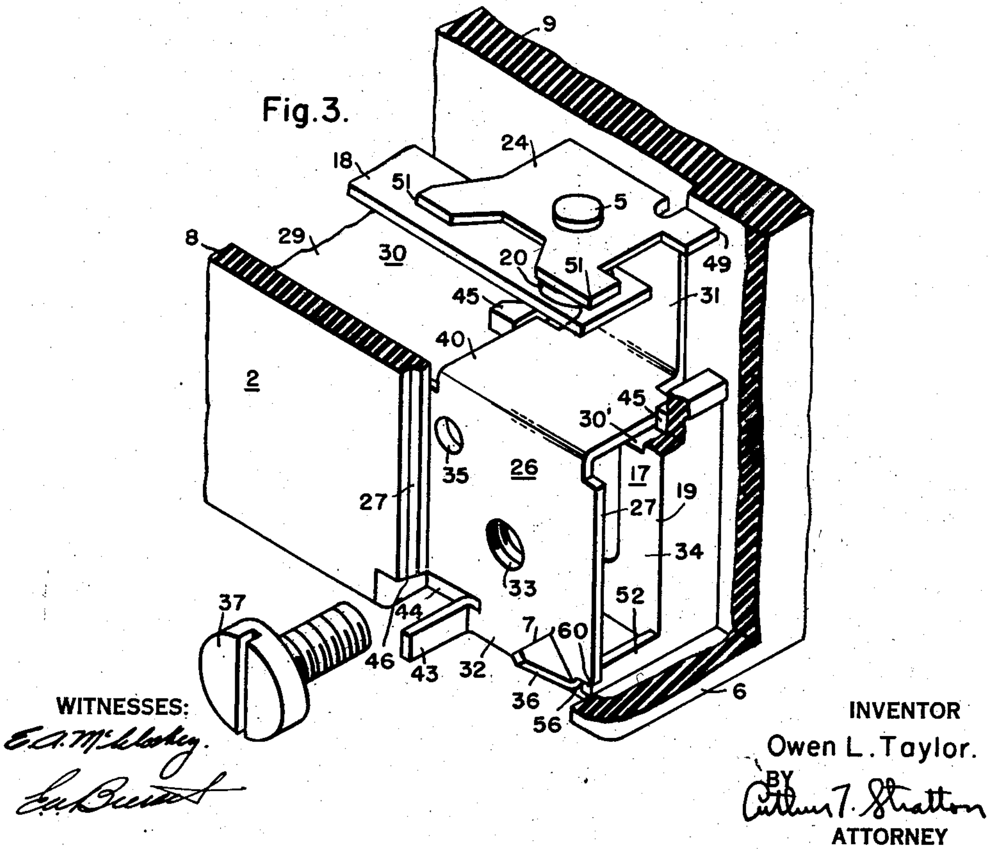
Fig. 3 is a perspective view partly in section of that portion of the switch housing shown in Fig. 1 wherein a terminal is located, and showing a portion of a switch contact arm and a terminal screw exploded therefrom.
Figure 4:
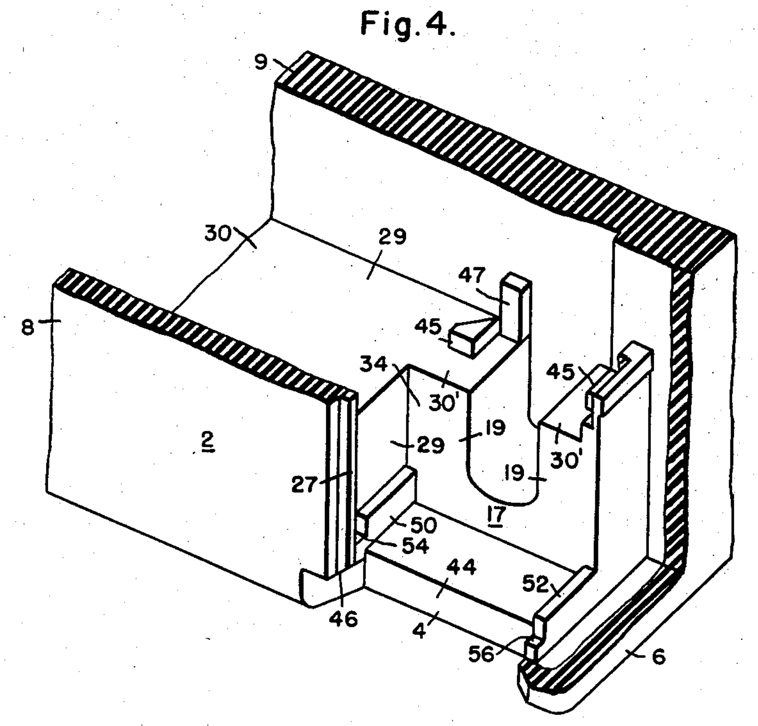
Fig. 4 is a perspective view partly in section of that portion of the switch housing shown in Fig. 3 having the terminal removed.

As shown in Figs. 3 and 4, housing 2 is provided with integral, internal longitudinally extending barriers 9 separating each end of the two switches, with the barriers 9 being somewhat shorter in height than the end wall 6 and side walls 8, in order to provide clearance of the cover 10. Bottom wall 4 is provided with an integral portion 29 between side walls 8 and barriers 9 with an elevated upper surface 30. Each corner of housing 2 has a terminal recess 34 which is accessible from the outside of housing 2 by means of an irregular opening 27 provided in the adjacent side wall 8. The terminal recesses 34 are limited in lateral width by U-shaped portions 17 having upwardly extending arms 19. U-shaped portions 17 are integral with barriers 9, base 4 and base portion 29, and each arm 19 has an upper flat surface 30′ on the same plane as surface 30.

The operating handle 14 has its inner end located above a central recess 61 in the bottom wall 4 between barriers 9 in the housing 2, and the recess receives a resilient overcenter toggle mechanism, which will be hereinafter described. The handle 14 has at each side thereof integral operating cams 62, beyond which are located integral trunnions 64 which are adapted to be set in pivot recesses 66 formed in each side wall 8 of the casing, with the trunnions 64 being held in the pivot recesses 66 by the cover 10 when the cover 10 is secured over the open side of the housing 2. The operating handle 14 has oppositely extending stop projections 68 and an inwardly extending operating projection 70 having a substantially V-shaped pivot recess 72 formed in the outer end thereof.

Figure 2:
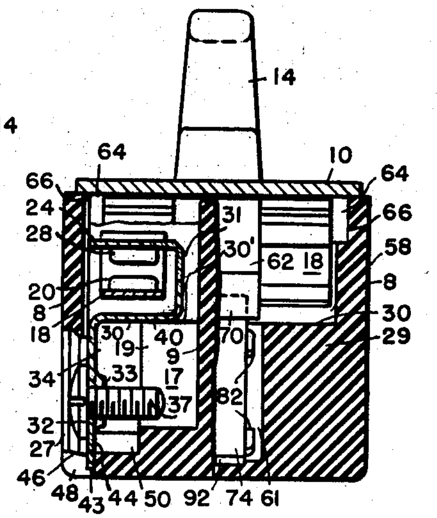
Fig. 2 is a transverse sectional view of the switch shown in Fig. 1, having the section at one side displaced from the section at the other side.

The operating mechanism includes a resilient overcenter toggle, and as shown in Figs. 1 and 2, one of the toggle levers is constituted by the operating handle 14, while the other comprises a pivoted block 74 of a flexible and resilient material, which is preferably formed of a synthetic rubber or other elastomer compound having like characteristics. Block 74 is provided with opposite inner and outer surfaces 76 having keeper plates 78 suitably secured thereon, with each of the keeper plates having a reversibly bent intermediate pivot portion 80 and side tabs 82 for engaging opposite sides of the block 74, as well as tabs 84 for engaging portions of the block 74 adjacent each end of the keeper plates 78. As illustrated, the resilient toggle block 74 has tapered end walls 88 which cooperate with the tapered end walls 90 of the central recess 61 of the housing 2 to limit the pivotal movement of the toggle block 74 about the pivot portion 80 of its keeper plate 78 which engages the substantially V-shaped pivot recess 92 formed in the bottom wall of the casing. The resilient toggle block 74 is assembled intermediate the base 4 of the housing 2 and the inner operating projection 70 of the operating handle 14, with the pivot portions 80 of the keeper plates being pivotally received in the bearing recesses 72 and 92 provided in the handle operating projection 70 and base 4 of the housing 2, respectively, with block 74 compressed to a certain degree.

The switches are operated upon movement of handle 14 by the operating cams 62, each of which is provided with a circular portion 94 having a relatively short radius from the pivot axis of handle trunnions 64 which is adapted, when the switch is in the closed position and the handle is operated, to engage the offset portion 100 of each arm 18. Cam portion 94, when handle 14 is operated upward as shown in Fig. 1, engages the offset portion 100 of each switch arm 18 to depress arm 18 downward and cause contacts 20 and 28 to be opened. It will be noted that the movement of operating handle 14 is limited by means of stop projections 68 engaging the outer corners of the block 74. Each of the arms 18 are biased to engage their stationary contact 28 and are operated to open position by the cam abutment 94 upon appropriate movement of the operating handle 14. The lower end wall 6, as viewed in Fig. 1, is provided with an integral stop shoulder 102 which is engageable with the outer free end of each arm 18 to limit the opening movement of the switch to a small amount. It will be apparent that by this construction, movement of the operating handle in opposite directions will cause the resilient block 74 to be stressed and to move over center, whereby contacts 20 and 28 will be quickly operated, as more particularly described in the aforesaid co-pending application.

Referring again to Figs. 3 and 4, each terminal 26 is designed to be mounted in the recess 34 provided in each corner of the housing 2, and accordingly, is formed with the various construction details hereinafter described. Terminals 26 are preferably formed from any relatively rigid yet bendable electrical conducting material, such as copper or brass, which may easily be fabricated as desired. As has been indicated, the upper end of each terminal 26 is U-shaped, having an upper leg 24 and a lower leg 40 connected together by a bight portion 31. An integral terminal plate 32 extends downwardly at approximately a right angle from the outer edge of lower leg 40, and is provided with a centrally located tapped hole 33 in order to receive a terminal screw 37. Terminal plate 32 is also provided with a hole 35 upwardly and inwardly disposed from the hole 33, and with an integral outwardly extending projection 36 at its lower edge adjacent one corner, in order that electrical connections may be made quickly and easily to each terminal plate 32. In making such electrical connections, the terminal screw 37 is initially threaded into tapped hole 33, and the bare electrical conducting wire inserted into hole 35. Thereafter, the electrical conductor may be bent in a clockwise manner around terminal screw 37 so that it rests between the head of terminal screw 37 and terminal plate 32, and then bent downwardly so that it rests against the upward edge 7 of projection 36. Upon tightening of the terminal screw 37, the electrical conductor is securely held against the terminal plate 32. If desired, terminal screw 37 may be staked at its inner edge after having initially been threaded into hole 33 in order that screw 37 cannot easily be removed thereafter. For a more particular description of a similar terminal incorporating a hole and guiding member, reference is hereby made to copending application Serial No. 343,704, filed March 20, 1953, on a Terminal Connecting Device, by W. I. Littman, which has been assigned to the same assignee as this invention.

Figure 5:
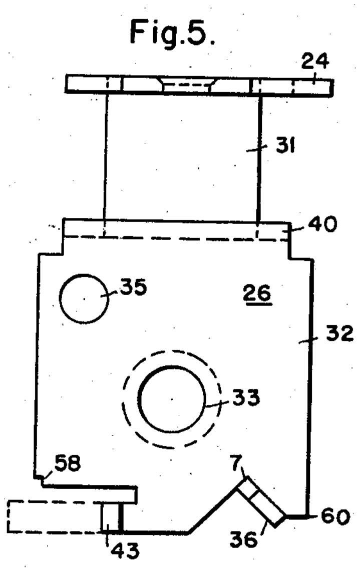
Fig. 5 is a front elevational view of a terminal constructed in accordance with the principles of my invention.
Figure 6:
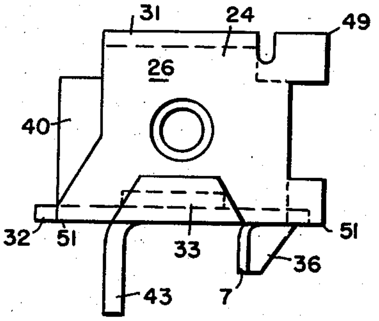
Fig. 6 is a top plan view of the terminal shown in Fig. 8.

It will also be noted that terminal recesses 34 of housing 2 are irregular in form in order that terminals 26 may be slid into place from the open side of the housing and accurately located within the housing 2. Accordingly, base 4 is provided with an inward offset beneath each opening 27 whereby a flat longitudinally extending back surface 44 is formed. The offset also extends beneath the innermost side of opening 27 in such a manner as to form a downwardly tapered surface 46 on the under side of the innermost side of opening 27. Each terminal recess 34 is provided with longitudinally spaced, upwardly extending projections 50 and 52 which are integral with base 4 at each side of the terminal recess 34. Projections 50 and 52 are provided with outer notches 54 and 56, respectively, which are vertically displaced from each other, for purposes hereinafter described. Referring additionally to Figs. 5 and 6, it will be noted that the lower edge of the terminal plate 32 of terminal 26 is provided with an offset corner 58 at one side, and a square corner 60 at its other side which are vertically displaced from each other. Terminal plate 32 is also provided at its lower edge with an outward extension 43 whereby the terminal 26 may be secured to the housing 2, as hereinafter described. As shown in Fig. 1, terminals 26 for each switch are similar and may be formed by similar processes. However, terminals 26 at opposite ends are not interchangeable as their extensions 43 are disposed towards each other.

In assembling a switch, terminals 26 with or without screws 37 attached are initially inserted in recesses 34 from the open side of housing 2 so that extension 43 projects outwardly through opening 27. Thereafter, the terminal plate 32 is forced downwardly behind opening 27 so that offset corner 58 engages the notch 54 of projection 50, and the square corner 60 engages the notch 56 of projection 52. The upper U-shaped portion of terminal 26 is located within housing 2 at the same time. Primarily, it will be noted that the under surface of the lower leg 40 extends across the top of terminal recess 34 and rests against the upper surface 30′ of the arms 19 of U-shaped portion 17, whereby terminal 26 is thus limited against further movement downwardly. Upper surfaces 30′ are provided with an integral pair of longitudinally spaced supporting blocks 45, respectively, which engage the sides of the lower leg 40 and prevent the lower leg 40 from being longitudinally displaced within the housing 2. At the junction of the housing ends 6 and barriers 9, the barriers 9 are made slightly thicker. Such thicker portion of barriers 9 does not extend to the inner leg of U-shaped portion 17 and, accordingly, such inner leg 19 is provided with an integral spacer block 47 whereby the inwardly facing portion of bight portion 31 is supported by both the thicker portion of barrier 9 and the support block 47. The upper leg 24 of each terminal 26 is provided with an integral inner extension 49, which abuts against the thickened portion of barrier 9, and a pair of outer extensions 51 which abut against the side wall 8. If desired, side walls 8 may be partially recessed in order to accommodate lengthened extensions 51. By this construction, it will be noted that the terminal 26 when so inserted is accurately located and supported against any movement except upward return movement. In order to prevent vertical movement of terminals 26, the extension 43 is bent until it engages the sloping surface 46. Further movement of the extension 43 causes extension 43 to be cammed downwardly whereby terminal 26 is stressed into engagement with the housing and rigidly secured at its innermost position. Thereafter, terminal 26 cannot be readily removed. It should also be noted that clearance for terminal screw 37 is provided between the arms 19 of the U-shaped portion 17.

Thus, it will be noted that I have provided a single terminal structure which may be produced inexpensively by standard manufacturing methods and which incorporate a simple means for mounting the terminal on an insulating support. Further, such a terminal may be provided with a terminal screw before or after the terminal is inserted within a wiring device housing. Still more important, however, is that my construction holds the terminal rigidly with respect to the housing so that the contact portion of the terminal is held in the proper position at all times.

Another switch design incorporating a modified form of terminal constructed in accordance with the principles of my invention is shown in Figs. 7 to 11 and comprises a somewhat similar housing 2′ in which an operating mechanism identical to that previously described is located. Accordingly, the identical parts of the operating mechanism have been given the same reference numerals, and their description will not be repeated. It will be noted, however, that this second embodiment is of a single pole switch and accordingly, handle 14′ need only be provided with a single switch operating cam 62 and that arm 18′ is of slightly different form.

Figure 7:
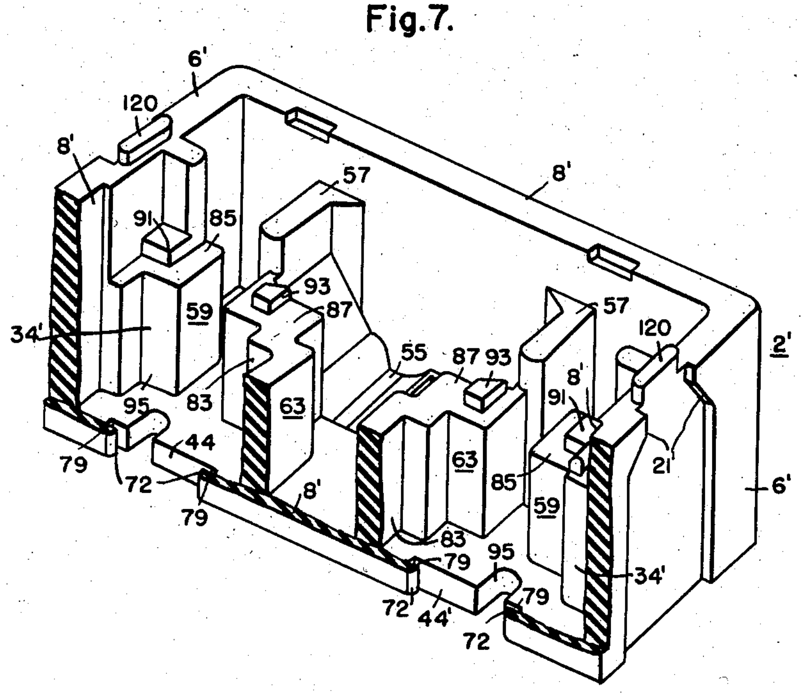
Fig. 7 is a perspective view illustrating a longitudinal section of another switch housing, which is adapted to receive another type of terminal construction in accordance with the principles of my invention.

Referring to Fig. 7, it will be noted that housing 2′ is divided into two longitudinally extending chambers, one of which is for the purpose of receiving an operating mechanism as previously described and the other of which is for the purpose of receiving a switch as previously discussed. As before, base 4′, end walls 6′ and side walls 8′ form an open sided housing 2′ which is adapted to be covered by a cover 10′ which is preferably formed from any suitable insulating material. It will be noted, however, that housing 2′ is provided with upwardly extending projections 120 which are centrally located on each end wall 6′ and which are adapted to engage a yoke member 11 which is preferably formed of any suitable ductile material, such as steel. Yoke 11 is suitably secured to the cover 10′ and is provided at each of its ends with downwardly extending bendable fastening lugs 15, which are cooperable when deformed with formed offset portions 21 in each end wall 6′ of housing 2′ to secure the yoke to the housing 2′. It should also be noted that yoke 11 is provided with suitable mounting means, such as holes 121, whereby the switch may be mounted in any one of a variety of standard outlet boxes.

The longitudinally extending chambers within housing 2′ may be of varying lateral width and may be located adjacent either side wall 8′ depending on the particular arrangement which may be desired. As shown, the mechanism chamber is provided with a pair of integral upwardly and inwardly extending formed end walls 57 having a depressed portion 55 therebetween for the purpose of receiving the operating mechanism. The switch chamber is provided at each end with inward and upwardly extending portions 59 integral with end walls 6′, and with a pair of spaced apart intermediate walls 63, integral with walls 57 and the adjacent side wall 8′, for the purpose of forming a pair of terminal recesses 34′ at each of the longitudinal ends of housing 2′.

Figure 8:
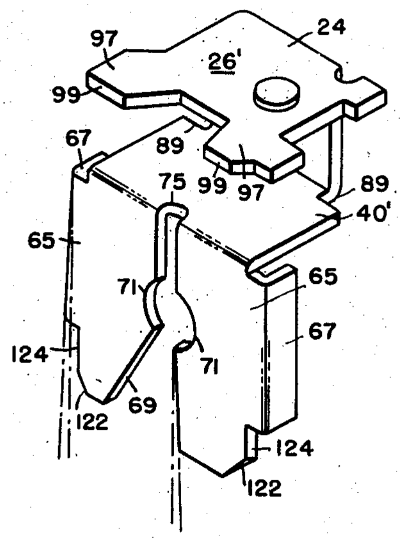
Fig. 8 is a perspective view of the type of terminal for use in the housing shown in Fig. 7 which is constructed in accordance with the principles of my invention.

Referring to Fig. 8 it will be noted that the terminal 26′ has an upper U-shaped portion substantially similar to the upper portion of the terminal 26 previously described. Terminal 26′ differs substantially from terminal 26 in that in place of a solid terminal plate 32, a pair of longitudinally spaced terminal arms 65 extend downwardly from the upper U-shaped portion, and each arm is provided with integral inwardly extending flanges 67 for the greater part of their length from the upper edge of each arm 65. The outer end of one of the arms 65 may be tapered outwardly as at 69 from the center line of the terminal 26′ to provide additional clearance between the arms 65. The inner edge of each arm 65 is provided at the same point with an arcuate recess 71 which forms an approximately circular opening for the purpose of receiving a terminal screw 37′. In order to provide means for establishing electrical connections to terminals 26′ the inner end of terminal screw 37′ is provided with a curved nut 73 (Fig. 11) and, if desired, screw 37′ may be staked at its outer end to prevent the removal of nut 73 from the terminal screw 37′. It should be noted that the lower leg 40′ of terminal 26′ is provided with an offset 75 between the terminal arms 65 in order to facilitate the flexing of terminal arms 65 inwardly, as hereinafter described.

Figure 9:
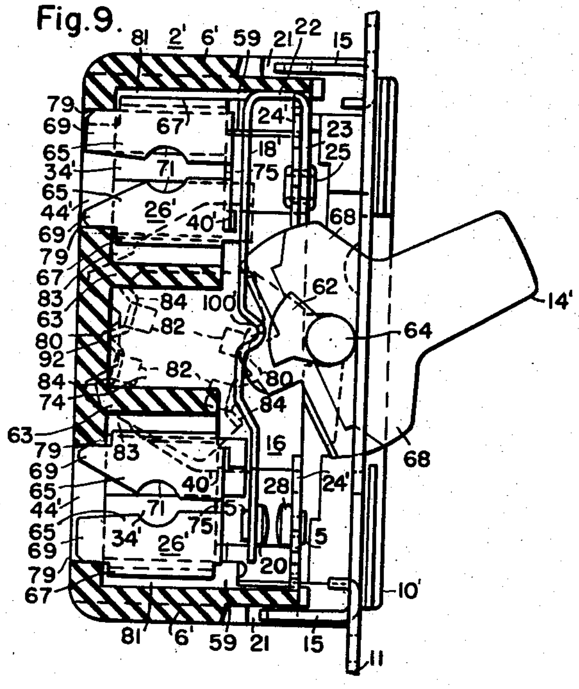
Fig. 9 is a longitudinal sectional view of a switch having the terminals shown in Fig. 8 and the housing shown in Fig. 7.
Figure 10:
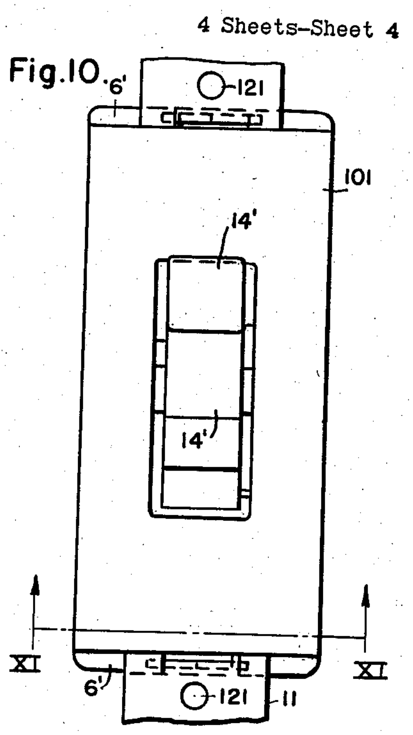
Fig. 10 is a top plan view of the switch shown in Fig. 9.
Figure 11:
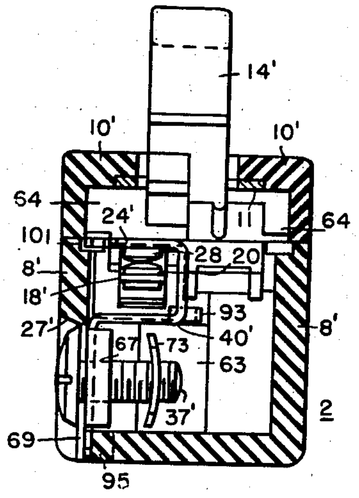
Fig. 11 is a transverse sectional view of the switch shown in Figs. 9 and 10, taken substantially along the line XI—XI of Fig. 10.

Referring to Figs. 9, 10 and 11, it will be noted that in order that a terminal 26′ be accessible from the exterior of housing 2′ the side wall 8′ of housing 2′ is provided with longitudinally spaced openings 27′ which may have a rounded outer edge 72. In order that terminals 26′ may be supported adjacent openings 27′, base 4′ of housing 2′ is recessed at the opening 27′, whereby a back surface 44′ having notches 79 at each end of the recess are formed. By this construction a terminal 26 may be inserted from the open side of the housing 2' so that the back side of the lower ends of arms 65 are positioned against the back surface 44' and the outer edges thereof located within notches 79. Referring again to Fig. 8 it will be noted that by forming arms 65 so that their longitudinal width is slightly greater than the distance between the bases of notches 79, when the terminal 26' is forced into position the arms 65 will be cammed into notches 79 by the camming action of the outer corners 22 of the arms in the notches 79, whereby opposing stresses will be induced in each arm 65 which will hold the arms in engagement with the notches 79. Inasmuch as arms 65 are forced into position, flanges 67 act to strengthen arms 65 against buckling, and also engage the base 4 to limit the downward travel of terminal 26. To provide sufficient clearance for flanges 67 inwardly extending notches 81 are provided in end walls 6', and a recess 83 is provided in each intermediate wall 63. It will be noted that the force created by stressing arms 65 together will be operative substantially normally against the notches 79, and it will not have any appreciable upward component which would tend to force terminal 26' upward.

It will also be noted that the underside of lower leg 40' of terminal 26' is then supported by the upper surfaces 85 and 87 of extending portions 59 and central walls 63, respectively. The junction of lower leg 40' and bight portion 31' of terminal 26' forms longitudinally spaced notches 89, which receive integral upward projections 91 and 93 on portions 59 and central wall 63, respectively, to prevent terminals 26' from being displaced or rotated inwardly within the housing 2'. Further, an inwardly extending notch 95 is provided in the base 4' whereby a wire may be inserted from the exterior of the housing 2'. Notch 95 is offset laterally from the center line of the terminal screw 37' in order that such an inserted wire (not shown) may be positioned between the curved nut 73 and the inner surface of the outer arms 65 of terminal 26'. As before, adequate space is provided between portions 59 and intermediate walls 63 so that the inner portion of terminal screw 37' may extend fully within the housing 2'. Also the upper leg 24' of each terminal 26' is provided with outward projections 97 having outwardly facing sides 99 which are adapted to engage in the notches 101 provided in adjacent wall 8' of housing 2'. In this manner terminal 26' may extend the full height of housing 2' and be flush with the upper edge of the housing 2' and still be securely supported within housing 2'. Further, it will be noted that the switch shown in Figs. 7 to 11 functions in the same manner as the switch previously discussed. Accordingly it is not believed that further discussion as to switch operation is necessary.

Having described preferred embodiments of my invention it is desired that the invention be not limited to the particular form specifically illustrated and described herein, as it will be readily apparent to persons skilled in the art, that various changes and modifications may be made in the particular constructions shown without departing from the broad spirit and scope of my invention. Accordingly, it is desired that the invention be given a broad scope and that it be limited only as required by the prior art.

I claim as my invention:

1. A wiring device comprising an insulating support member, a metal terminal member having a connecting portion from which generally similar elongated resilient arms extend in one direction, each of said arms having an enlarged generally flat surface lying closely adjacent each other in substantially the same plane to define a terminal surface for at least one wiring connection to be made thereto, a terminal screw of a diameter larger than the spacing between said arms and located in opposed cutout portions in the adjacent edges of said arms, spaced portions on said support member which are spaced from each other a different distance than opposed portions of said arms, and said spaced portions on said support member extending transversely to and engaging said opposed portions of said arms so that said terminal member is frictionally secured to said support member by inserting said portions on one of said members between the portions on the other of said members to force each of said arms to move in said plane.

2. A wiring device comprising a dished casing of insulating material, a terminal of angular shape in said casing adapted to have a first portion with a contact member thereon seat on a part of said casing, said terminal having a second portion including a movable projection, said casing having an integral surface, said surface and said projection being located at different fixed distances from said seat, said projection being movable into engagement with said surface whereby said second portion of the terminal is stressed between said seat and said surface to force said first portion of the terminal into firm engagement with said support, and an opening in the side of said casing adjacent the second portion of the terminal to provide access thereto.

3. A wiring device comprising a dished casing of insulating material, a terminal of angular shape in said casing adapted to have a first portion with a contact member thereon seat on a part of said casing, said terminal having a second portion including a movable projection located a fixed distance from said seat, said casing having an integral sloping surface having one end spaced at least the same fixed distance from said seat as said projection, said sloping surface being located in the path of movement of said projection whereby forced movement of said projection causes it to engage said sloping surface so as to stress said second portion between said seat and said sloping surface whereby said first portion of the terminal is forced into firm engagement with said casing, and an opening in the side of said casing adjacent the second portion of the terminal to provide access thereto.

4. A wiring device comprising a dished casing of insulating material having an opening in one side thereof, a terminal having a U-shaped portion and a portion extending transversely from one arm of said U-shaped portion, a switch contact mounted on the other arm of said U-shaped portion, said terminal being adapted to be inserted within said casing so that said one arm seats on one part of said casing to support said arms transversely with respect to said one side of said casing and with said extending portion being located behind said opening so as to be accessible therethrough, a movable projection integral with said extending portion, and an integral surface on said support located in the path of movement of said projection so that movement thereof stresses said extending portion of said terminal to definitely locate said terminal with respect to said casing.

5. A wiring device comprising a dished casing of insulating material having an opening in one side thereof, a terminal having a U-shaped portion and a portion extending transversely from one arm of said U-shaped portion, a switch contact mounted on the other arm of said U-shaped portion, said terminal being adapted to be inserted within said casing so that said one arm seats on one part of said casing to support said arms transversely with respect to said one side of said casing and with said extending portion being located behind said opening so as to be accessible therethrough, said extending portion of said terminal comprising a pair of spaced resiliently yieldable arms, each having an outside surface positioned to engage approximately parallel surfaces located adjacent said opening when said arms are forced between said surfaces, and said approximately parallel surfaces being spaced a slightly smaller distance apart than the outside surfaces of said arms whereby engagement stresses said arms of the terminal to definitely locate said terminal with respect to said casing.

6. A wiring device comprising a dished casing of insulating material having an opening in one side thereof, said casing having an integral seat located therein adjacent said opening, a terminal including a first and second part angularly displaced from each other adapted to have one part with a contact member thereon engage said seat and the other part projecting approximately parallel to said opening when said terminal is inserted within said casing, said second part having a projection initially extending outwardly from said casing through said opening, said casing having an integral sloping surface offset from one side of said opening and extending transversely to said second part of the terminal, said surface and said projection being located different distances from said seat so that movement of said projection into engagement with said surface causes the surface to cam the projection whereby said second part of the terminal is stressed between the seat and the surface.

7. A switch comprising a pair of toggle levers mounted in a casing one of which is manually movable for moving said pair of toggle levers over-center, separable contacts which are moved into and out of engagement by movement of said toggle levers overcenter in opposite directions, each of said contacts being secured to one arm of spaced terminals each having a U-shaped portion supported on a seat in said casing and a contact portion extending transversely from the free end of the other arm of said U-shaped portion, said contact portion including a movable projection located a fixed distance from said seat, said support having an integral sloping surface having one end spaced at least the same fixed distance from said seat as said projection, said sloping surface being located in the path of movement of said projection whereby forced movement of said projection causes it to engage said sloping surface so as to stress said contact portion between said seat and said sloping surface whereby said terminal is forced into firm engagement with said support, and an opening in said casing to provide access to said contact portion.

8. A wiring device comprising an insulating support member, a metal terminal member having a connecting portion from which generally similar elongated resilient arms extend in one direction, each of said arms having an enlarged generally flat surface lying closely adjacent each other in substantially the same plane to define a terminal surface for at least one wiring connection to be be made thereto, a terminal screw of a diameter larger than the spacing between said arms and located in opposed cutout portions in the adjacent edges of said arms, spaced portions on said support member which are spaced from each other a slightly smaller distance than the outer edges of said arm, and said spaced portions on said support member extending transversely to and engaging said outer edges of said arms so that said terminal member is frictionally secured to said support member by inserting said arms between said spaced portions with said arms being forced laterally toward each other.

9. A wiring device comprising a dished casing of insulating material having an opening in one side thereof, a terminal having a U-shaped portion and a portion extending transversely from one arm of said U-shaped portion, a switch contact mounted on the other arm of said U-shaped portion, said terminal being adapted to be inserted within said casing so that said one arm seats on one part of said casing to support said arms transversely with respect to said one side of said casing and with said extending portion being located behind said opening so as to be accessible therethrough, said extending portion of said terminal comprising a pair of spaced resilient arms, each having an outer portion positioned to engage approximately parallel portions on said casing located adjacent said opening when said arms are forced between said parallel portions, and said approximately parallel portions being spaced a slightly smaller distance apart than the outer portions of said arms whereby such engagement stresses said arms of the terminal to definitely locate said terminal with respect to said casing.

10. A wiring device comprising, a hollow casing of insulating material having an open top, a contact-terminal having a substantially U-shaped section, a contact member secured on one leg of said U-shaped section, the other leg of said U-shaped section having at least one integral and laterally outwardly extending terminal portion, said contact-terminal being supported in said casing with said terminal portion extending along one side wall of the casing toward the bottom of the casing, an opening in said side wall to permit access to at least a part of said terminal portion, and said casing having spaced portions positioned to engage said contact-terminal at spaced points at least one of which is on said terminal portion, and said spaced portions and spaced points being spaced different distances apart, respectively, so that said terminal portion is stressed into engagement with said spaced portions of said casing.

11. A wiring device comprising, a hollow casing of insulating material having an open top, a contact-terminal having a substantially U-shaped section, a contact member secured on one leg of said U-shaped section, the other leg of sad U-shaped section having at least one integral and laterally outwardly extending terminal portion, said contact-terminal being supported in said casing with said terminal portion extending along one side wall of the casing toward the bottom of the casing, an opening in said side wall to permit access to at least a part of said terminal portion, said casing having a third portion engaging the bight portion of said U-shaped section to hold said terminal portion flush against said one side wall, and said casing having spaced portions positioned to engage said contact-terminal at spaced points at least one of which is on said terminal portion, and said spaced portions and said spaced points being spaced different distances apart, respectively, so that said terminal portion is stressed into engagement with said spaced portions of said casing.

12. A wiring device comprising, a hollow casing of insulating material having an open top, a contact-terminal having an angular shape, a contact member secured on one leg of said contact-terminal, another leg of said contact terminal comprising at least one integral and laterally outwardly extending terminal portion, said contact-terminal being supported in said casing with said terminal portion extending along one side wall of the casing toward the bottom of the casing, an opening in said side wall to permit access to at least a part of said terminal portion, and said casing having spaced portions positioned to engage said contact-terminal at spaced points at least one of which is on said terminal portion, and said spaced portions and spaced points being spaced different distances apart, respectively, so that said terminal portion is stressed into engagement with said spaced portions of said casing.

References Cited in the file of this patent

UNITED STATES PATENTS

| | | |
|---|---|---|
| 1,828,059 | Neuer | Oct. 20, 1931 |
| 1,992,806 | Bernander | Feb. 26, 1935 |
| 2,039,957 | Hall | May 5, 1936 |
| 2,085,217 | Hart | June 29, 1937 |
| 2,099,555 | Bernander | Nov. 16, 1937 |
| 2,329,471 | King | Sept. 14, 1943 |
| 2,431,366 | Buell | Nov. 25, 1947 |
| 2,606,264 | Jacobi | Aug. 5, 1952 |
| 2,669,613 | Despard | Feb. 16, 1954 |

FOREIGN PATENTS

| | | |
|---|---|---|
| 40,818 | Denmark | May 29, 1928 |
| 108,034 | Sweden | July 27, 1943 |
| 434,084 | Great Britain | Aug. 26, 1935 |
| 446,178 | Great Britain | Apr. 24, 1936 |
| 606,899 | Germany | Dec. 13, 1934 |